Jan. 31, 1933.　　　C. C. GREEN　　　1,895,987
ADJUSTMENT LEVER
Filed Nov. 3, 1930　　2 Sheets-Sheet 1
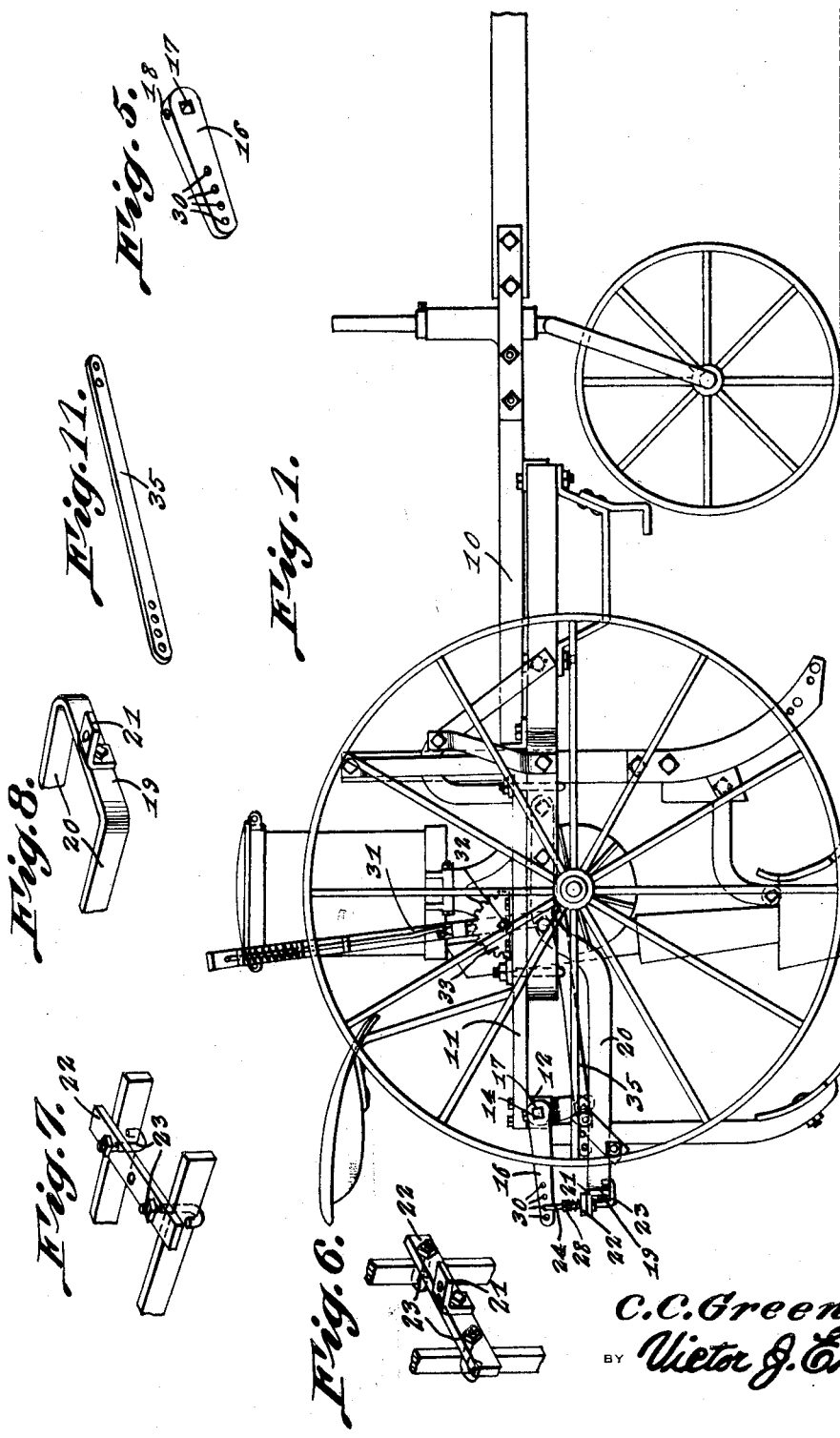
C. C. Green, INVENTOR
BY Victor J. Evans
ATTORNEY

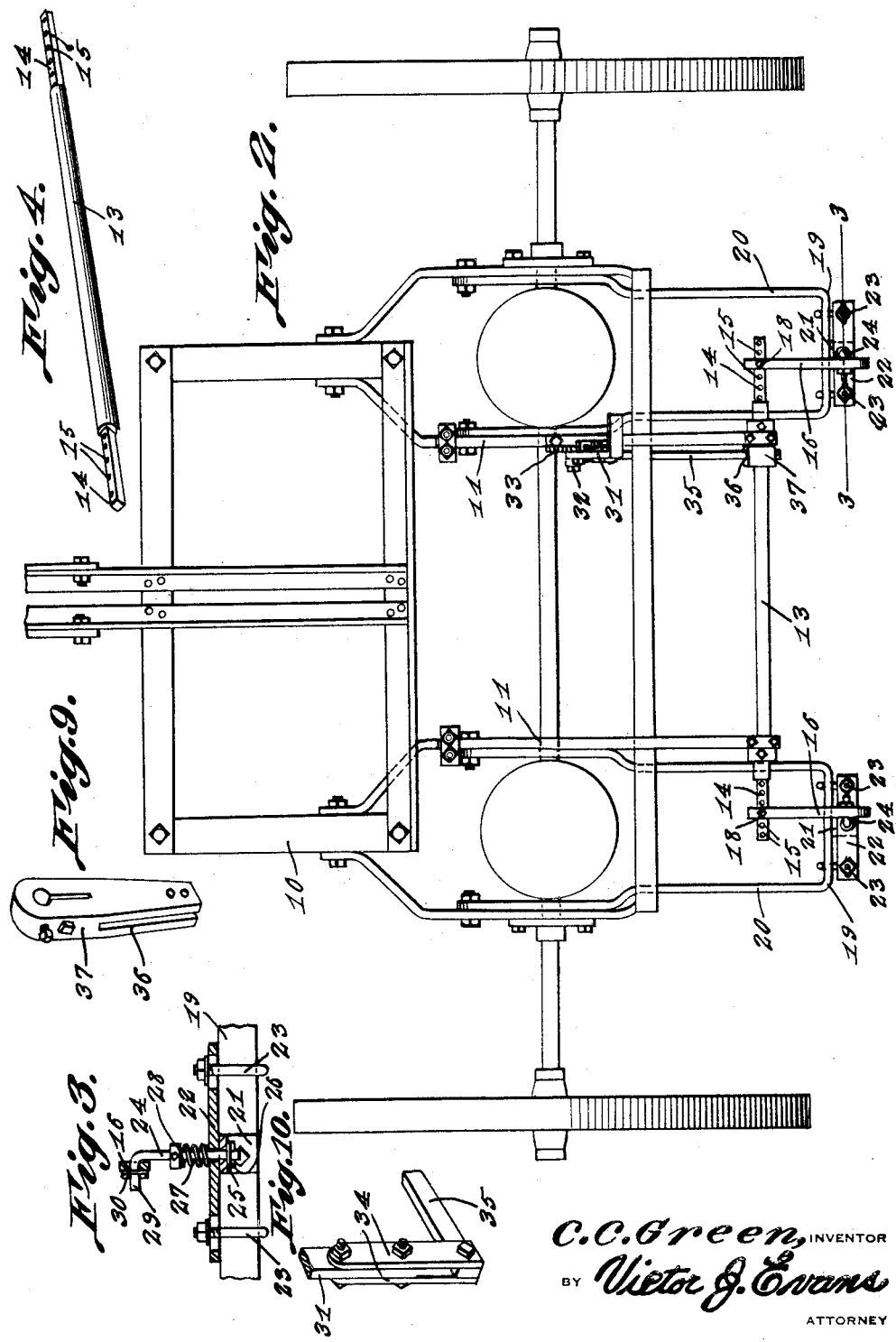

Patented Jan. 31, 1933

1,895,987

UNITED STATES PATENT OFFICE

CHARLIE C. GREEN, OF PLANO, TEXAS

ADJUSTMENT LEVER

Application filed November 3, 1930. Serial No. 493,119.

This invention relates to certain new and useful improvements in agricultural implements and more particularly to means of adjustment for the shovel coverers of planters.

One of the principal objects of the invention consists in the provision of a lever for this purpose designed to regulate the depth projection of the shovel coverers from the driver seat of the implement.

An additional object of the invention embodies a yieldable connection between the adjusting lever and shovel coverers whereby the latter upon encountering roots, rocks and other obstructions may elevate themselves against the tension of the yieldable support to prevent breaking of the coverers and the transmitting of shock or other motion to the planter whereby the latter may function in the manner intended.

With the above and other objects in view, the invention further consists of the following novel features and details of construction, to be hereinafter more fully described, illustrated in the accompanying drawings and pointed out in the appended claim.

In the drawings:

Figure 1 is a side elevation of a planter with the present invention applied.

Figure 2 is a fragmentary top plan view of the planter and the attachment.

Figure 3 is a longitudinal sectional view taken on line 3—3 of Figure 2 through the yieldable support.

Figure 4 is a perspective view of the rock shaft for imparting the desired motion to the shovel coverers.

Figure 5 is a perspective view of an adjustable form of crank arm for the rock shaft.

Figure 6 is a fragmentary perspective view of shovel coverer standards illustrating the arrangement of the immediate portion of the adjusting means thereon.

Figure 7 is a fragmentary perspective view of a modified form of connection for separate swingably supported shovel coverer bars.

Figure 8 is a fragmentary perspective view of a yoke form of shovel coverer support with a different variation of adjustable connection.

Figure 9 is a perspective view of a second crank arm.

Figure 10 is a fragmentary perspective view of the connection established between the operating lever and drag link.

Figure 11 is a perspective view of the shovel operating connecting link.

Referring to the drawings in detail wherein like characters of reference denote corresponding parts, the reference character 10 indicates generally the chassis of a conventional form of planter for corn, cotton and the like and which has supported thereon a pair of arms 11 rearwardly projecting therefrom in spaced parallelism in the manner suggested in Figures 1 and 2 of the drawings. Bearing members 12, carried upon the rearmost projecting ends of each of the arms, journally accommodate a rock shaft 13; the latter terminating to provide squared ends 14 apertured, as at 15, for purposes to be better understood in the following description of the invention. Crank arms 16, having squared socket openings 17 for the accommodation of the ends 14 of the rock shaft, have set screws or other locking elements, such as indicated at 18, for reception within the openings 15 whereby lateral displacement of the crank arms will be prevented. Said crank arms are designed to extend rearwardly and above the yoke ends 19 of shovel coverer swingably supported U-shaped bars 20. The shovel coverers are mounted upon the bars 20 in the conventional manner. Supporting members 21 of angular formation, carried upon the outer sides and at points intermediate the lengths of the yoke ends or connecting portions 19, have seated upon the upper surfaces thereof plate members 22. Bolt members 23 of L-shape formation have the yoke ends thereof positioned to receive the under side edges of the yoke portions 19 whereas the threaded shanks therefor are passed through openings adjacent the ends of the plates 22, substantially as illustrated in Figures 1 and 3 of the drawings.

Connecting rods 24, passed through registering openings in the overlapping portions of the angular supporting plates 21 and the elongated plates 22, carry washers 25 and cross pins 26 upon their lowermost ends and compression springs 27 upon those portions thereof extending upwardly and beyond the upper surface of the elongated plates 22. An adjustably mounted stop collar 28 is arranged upon each of the connecting rods 24 for abutting engagement with the upper end convolutions of the compression springs 27 whereby the degree of spring tension to be exercised upon the shovel coverers may be regulated. As suggested from the illustration of my invention in Figure 3 of the drawings, the uppermost or extreme ends of the connecting rods 24 are offset, as at 29, for accommodation within any one of a plurality of openings 30 in the opposite ends of the crank arms 16. An operating lever 31, pivotally mounted, as at 32, upon a bolt member passed through a segment 33 immovably positioned upon the chassis 10, carries link members 34 upon opposite sides thereof which project rectilinearly thereof beyond the lowermost extremity. A drag link 35, pivotally mounted between the projecting ends of the links 35, is correspondingly disposed at its opposite end within the bifurcation 36 formed in the depending end of a crank arm 37 having adjustable connection with the rock shaft 13.

From the foregoing it will be noted that movement of the operating lever 31 in a rearward direction will cause the drag link 35 and crank arm 37 to move in a forward direction and the shaft 13 to rock in a direction whereby the crank arms 16 will be directed downwardly at an inclination with respect to the plane of the chassis whereby the shovel coverers will penetrate the soil more deeply and incidentally return more soil to the furrow.

The coverers, in turn, upon encountering stones, roots and other obstructions will raise upwardly against the compression springs 27 to prevent breaking of the shovel coverers and the transmitting of shock or other motions to the planter which may impair the desired function thereof.

From the illustrations of my invention in Figures 6 and 7 of the drawings, it is understood that it may be my desire to support or otherwise associate the shock absorbing adjusting connection either upon the shovel coverer standards or swingably mounted supporting bars.

The invention is susceptible of various changes in its form, proportions and minor details of construction and the right is herein reserved to make such changes as properly fall within the scope of the appended claim.

Having described the invention, what is claimed is:—

An attachment for planters comprising an operating lever, shovel coverer U-shaped supporting bars adapted to be swingably supported upon a planter, an apertured supporting member of angular formation mounted upon the connecting portion of the U-shaped bar, apertured attaching plates for said bars having certain of the apertures thereof aligning with the apertured supporting member, L-shaped attaching bolts passing through certain other apertures of said plates and contacting said connecting portion of the U-shaped bar for attaching a plate to each bar, a rock shaft mounted upon the planter having perforated end portions, crank arms adjustably mounted on the rock shaft, one of said crank arms being bifurcated at its depending end, the other crank arms being provided with a plurality of openings, a drag link having connection at one end with the operating lever, the opposite end of the drag link being connected within the bifurcated portion of the first-mentioned crank arm, a connecting rod protruding through the aligned apertures of each attaching plate and its supporting member and provided with an offset end for pivotally engaging the apertures of a latter-mentioned crank arm, a stop collar on each connecting rod, and a compression spring encircling each connecting rod and having one end bearing against said attaching plate and its opposite end against the stop collar of the connecting rod to provide a yieldable support.

In testimony whereof I affix my signature.

CHARLIE C. GREEN.